(12) United States Patent
Yokonuma et al.

(10) Patent No.: US 9,196,205 B2
(45) Date of Patent: Nov. 24, 2015

(54) SCANNING SIGNAL LINE DRIVE CIRCUIT AND DISPLAY DEVICE EQUIPPED WITH SAME

(71) Applicant: Sharp Kabushiki Kaisha, Osaka-shi, Osaka (JP)

(72) Inventors: Shinsuke Yokonuma, Osaka (JP); Hajime Washio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 14/345,477

(22) PCT Filed: Sep. 21, 2012

(86) PCT No.: PCT/JP2012/074212
§ 371 (c)(1),
(2) Date: Mar. 18, 2014

(87) PCT Pub. No.: WO2013/047363
PCT Pub. Date: Apr. 4, 2013

(65) Prior Publication Data
US 2014/0340600 A1 Nov. 20, 2014

(30) Foreign Application Priority Data

Sep. 27, 2011 (JP) .................................. 2011-210462

(51) Int. Cl.
*G09G 3/36* (2006.01)
*G02F 1/1362* (2006.01)
(52) U.S. Cl.
CPC ............ *G09G 3/3648* (2013.01); *G02F 1/1362* (2013.01); *G09G 3/3614* (2013.01); *G09G 3/3677* (2013.01); *G09G 2310/0224* (2013.01); *G09G 2310/0286* (2013.01)
(58) Field of Classification Search
CPC G09G 3/36; G09G 2310/0286; G02G 3/3677
See application file for complete search history.

(56) References Cited

U.S. PATENT DOCUMENTS

| 8,405,644 | B2* | 3/2013 | Kato ............................. 345/204 |
| 8,890,856 | B2* | 11/2014 | Sasaki et al. .................. 345/208 |
| 8,952,955 | B2* | 2/2015 | Yokoyama et al. ........... 345/215 |
| 2003/0030615 | A1* | 2/2003 | Maeda et al. ................... 345/90 |
| 2005/0030276 | A1* | 2/2005 | Murakami et al. ............. 345/102 |

FOREIGN PATENT DOCUMENTS

| JP | 2009-014965 A | 1/2009 |
| JP | 2009-103914 A | 5/2009 |
| JP | 2010-049767 A | 3/2010 |

OTHER PUBLICATIONS

Official Communication issued in International Patent Application No. PCT/JP2012/074212, mailed on Dec. 25, 2012.

* cited by examiner

*Primary Examiner* — Kumar Patel
*Assistant Examiner* — Afroza Chowdhury
(74) *Attorney, Agent, or Firm* — Keating & Bennett, LLP

(57) ABSTRACT

This liquid crystal display device allows outputs from RS-FF circuits (401 to 409) and switch circuits (411 to 419), which function as a shift register, to be provided as scanning signals that are selectively activated during odd and even scanning line selection periods, by simply changing the potential of an enable signal (EN) (i.e., by simply providing an EN signal line), which achieves interlacing drive that allows a reduction in the number of polarity inversions, thereby making it possible to reduce power consumption and a wiring area for control lines and achieve simple control which allows circuit simplification, resulting in a reduced frame area and a display panel which is compact as a whole.

7 Claims, 12 Drawing Sheets

SCANNING SIGNAL LINE DRIVE CIRCUIT AND DISPLAY DEVICE EQUIPPED WITH SAME

TECHNICAL FIELD

The present invention relates to active-matrix display devices, more specifically to a scanning signal line drive circuit in an active-matrix liquid crystal display device.

BACKGROUND ART

In general liquid crystal display devices, polarity inversion drive is performed in order to suppress liquid crystal deterioration. A known polarity inversion drive scheme is a scheme (frame inversion drive scheme) in which the polarity of a voltage applied to the liquid crystal is inverted every frame. However, this drive scheme is subject to display defects, such as flicker, upon display, and therefore, in the drive schemes employed in recent years, the polarity of an applied voltage is inverted every horizontal scanning signal line and also every frame (a so-called "line inversion drive scheme") or the polarity of an applied voltage is inverted every two vertically/horizontally adjacent pixels and also every frame (a so-called "dot inversion drive scheme").

The dot inversion drive scheme uses a relatively complicated anti-flicker pattern, and therefore, is resistant to flicker, so that high-quality display can be achieved. Moreover, in this scheme, a direct-current voltage is applied to a common electrode of a liquid crystal panel, and therefore, less noise occurs than in the scheme where the common electrode is driven by an alternating-current voltage.

However, in such a dot inversion drive scheme where a direct-current voltage is applied to the common electrode, the polarity of a video signal to be applied to the liquid crystal panel is switched between predetermined voltages respectively above and below the potential of the common electrode, and therefore, the voltage swing of a video signal outputted by a liquid crystal panel driver is large, so that a specialized power supply configuration is required and power consumption tends to be high. Moreover, in the line inversion drive also, more power consumption can be saved as the polarity inversion cycle of a video signal becomes longer (i.e., as the number of inversions per frame decreases).

Accordingly, for example, Japanese Laid-Open Patent Publication No. 2009-14965 discloses a configuration in which only the odd scanning lines are sequentially selected during a first field in order to output signals from a source driver, and thereafter, polarity inversions occur during the following field, i.e., second field, so that only the even scanning lines are sequentially selected in order to output signals from the source driver. In this manner, line inversion drive or dot inversion drive can be realized by simply performing one polarity inversion operation per frame. Such a drive scheme is called an interlaced scanning scheme or an interlacing drive scheme.

CITATION LIST

Patent Document

Patent Document 1: Japanese Laid-Open Patent Publication No. 2009-14965

SUMMARY OF THE INVENTION

Problems to be Solved by the Invention

Here, when compared to circuits for normal scanning, scanning line drive circuits (gate drivers) for interlaced scanning as in the aforementioned conventional configuration have complicated circuitry and more control signal lines. Accordingly, such scanning line drive circuits have larger areas. In a configuration where such a scanning line drive circuit is mounted on a liquid crystal panel or it is formed directly on a liquid crystal panel, an increase in the area of the scanning line drive circuit leads to an increased frame area of the liquid crystal panel, resulting in a problem in that size reduction of the liquid crystal panel can be prevented. In particular, liquid crystal panels for use in mobile information terminals are strongly required to be more compact, and therefore, the aforementioned problem is more severe.

Therefore, an objective of the present invention is to provide a scanning line drive circuit whose circuit area can be reduced and a liquid crystal display device including the same.

Solution to the Problems

A first aspect of the present invention is directed to a scanning signal line drive circuit for performing interlaced scanning to drive a plurality of scanning signal lines provided in an active-matrix display device such that odd scanning signal lines are sequentially driven by corresponding scanning signals during a first period, and even scanning signal lines are sequentially driven by corresponding scanning signals during a second period, the circuit comprising:

a shift register for providing output signals from output terminals coupled to their corresponding scanning signal lines, the output signals being activated sequentially; and a selection circuit for transmitting the output signals such that output signals from odd output terminals are provided only to their corresponding odd scanning signal lines during the first period, and output signals from even output terminals are provided only to their corresponding even scanning signal lines during the second period, wherein, the shift register provides first and second output signals during the first period and also provides third and fourth output signals during the second period, the first output signals being outputted from the odd output terminals and having active periods which are equivalent to active periods of scanning signals corresponding to the odd output terminals, the second output signals being outputted from the even output terminals and having active periods which correspond to invalid periods of the scanning signals and have a length less than or equal to the invalid live period, the third output signals being outputted from the even output terminals and having active periods which are equivalent to active periods of scanning signals corresponding to the even output terminals, the fourth output signals being outputted from the odd output terminals and having active periods which correspond to invalid periods of the scanning signals and have a length less than or equal to the invalid period.

In a second aspect of the present invention, based on the first aspect of the invention, the shift register externally receives first and second clock signals and provides the first and second output signals sequentially in accordance with active periods in the first clock signal and also the third and fourth output signals sequentially in accordance with active periods in the second clock signal, the first clock signal including all of the active periods of the first output signals in the first period and also including all of the active periods of the fourth output signals in the second period, the second clock signal including all of the active periods of the second output signals in the first period and also including all of the active periods of the third output signals in the second period.

In a third aspect of the present invention, based on the second aspect of the invention, the shift register includes a plurality of switching elements each connecting a signal line for transmitting the first clock signal and a corresponding odd output terminal or connecting a signal line for transmitting the second clock signal and a corresponding even output terminal; and a plurality of bistable circuits for outputting control signals to control continuity of the switching elements, and the bistable circuits cause the switching elements to transition to a nonconductive state after causing the switching elements to sequentially transition from a nonconductive state to a conductive state such that the switching elements are not conductive simultaneously.

In a fourth aspect of the present invention, based on the third aspect of the invention, the bistable circuits are set-reset flip-flop circuits each having a set terminal connected to an output terminal of a switching element controlled by a bistable circuit in its previous stage and a reset terminal connected to an output terminal of a switching element controlled by a bistable circuit in its subsequent stage.

In a fifth aspect of the present invention, based on the first aspect of the invention, the selection circuit includes a first logic circuit for receiving a control signal provided externally and an output signal outputted from the odd output terminal and outputting a signal which is active when both the output signal and the control signal are active, the control signal being active during the first period and also inactive during the second period, and a second logic circuit for receiving the control signal as well as an output signal outputted from the even output terminal and outputting a signal which is active when the output signal is active and the control signal is inactive.

In a sixth aspect of the present invention, based on the first aspect of the invention, the selection circuit including logic circuits each receiving a control signal as well as an output signal outputted from the output terminal and outputting a signal which is active when both the output signal and the control signal are active, the control signal being active during a predetermined period including a period in which the scanning signal is active, the control signal being inactive during a period corresponding to the inactive period.

A seventh aspect of the present invention is directed to an active-matrix display device comprising:

a scanning signal line drive circuit of the first aspect of the invention; and a video signal line drive circuit for driving video signal lines arranged so as to cross the scanning signal lines, the video signal lines transmitting data signals to pixel portions which form pixels.

Effect of the Invention

The first aspect of the invention allows outputs from the shift register with a simple configuration to be selected by the selection circuit with a simple configuration as odd and even scanning signals to be provided individually of each other, resulting in a compact scanning signal line drive circuit with reduced area. In addition, in the case where the scanning signal line drive circuit is mounted on a display panel, the frame area of the display panel can be reduced, so that the display panel can be reduced in size.

The second aspect of the invention renders it possible to select and output odd and even scanning signals individually of each other by simply changing the potentials of the first and second clock signals (and also the potential of a signal for controlling the selection circuit), i.e., typically, by simply providing a control signal line, resulting in a reduced wiring area for control lines. Moreover, simple control allows circuit simplification, resulting in a reduced circuit area.

In the third aspect of the invention, the shift register is configured by the switching elements and the bistable circuits, so that circuit simplification can be achieved, resulting in a reduced circuit area.

In the fourth aspect of the invention, the bistable circuits are RS-FF circuits, and therefore, can be configured in a simple manner.

The fifth aspect of the invention allows a simple control signal (whose cycle is long) to control the selection circuit, so that the control signal line for transmitting the control signal can be reduced in width, resulting in a reduced circuit area.

The sixth aspect of the invention allows simple circuits (typically, AND circuits) to be used as logic circuits included in the selection circuit, resulting in a reduced circuit area.

The seventh aspect of the invention allows the display device to achieve similar effects to those achieved by the first aspect of the invention.

MODES FOR CARRYING OUT THE INVENTION

Hereinafter, embodiments of the present invention will be described with reference to the accompanying drawings.

<1. First Embodiment>
<1.1 Overall Configuration and Operation>

Figure 1:
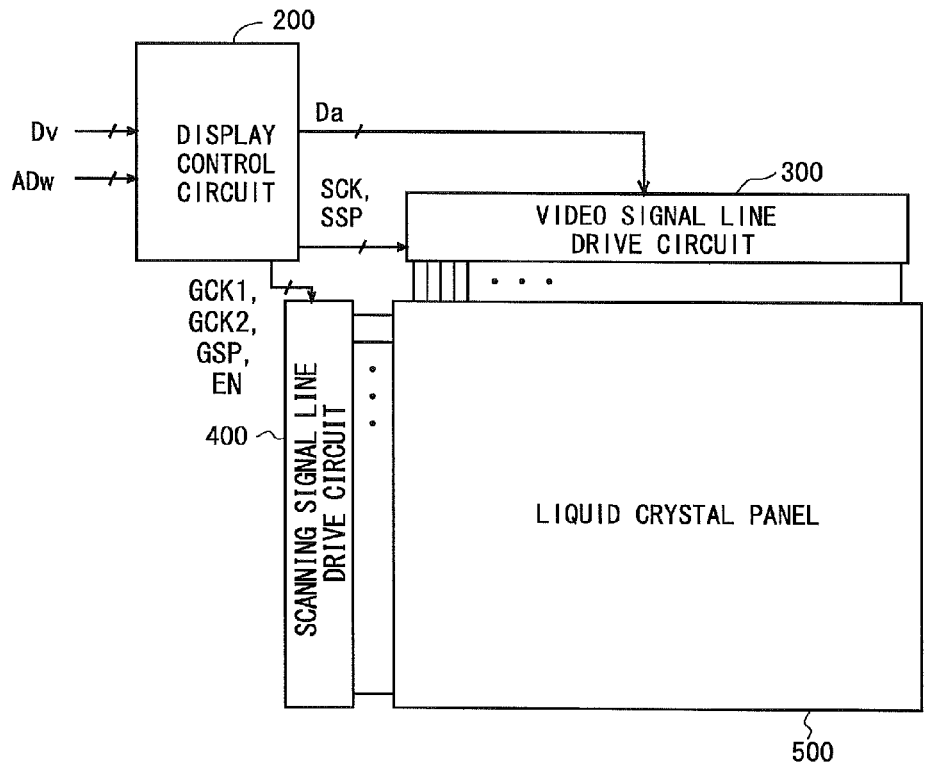
FIG. 1 is a block diagram illustrating the configuration of a liquid crystal display device according to a first embodiment of the present invention.

FIG. 1 is a block diagram illustrating the configuration of a liquid crystal display device according to an embodiment of the present invention. This liquid crystal display device includes a display control circuit 200, a video signal line drive circuit (also referred to as a "source driver circuit" or a "column-electrode drive circuit") 300, a scanning signal line drive circuit (also referred to as a "gate driver circuit" or a "row-electrode drive circuit") 400, and an active-matrix liquid crystal panel 500.

The liquid crystal panel 500, which serves as a display portion of the liquid crystal display device, includes a plurality of scanning signal lines (row electrodes), which correspond to respective horizontal scanning lines in an image represented by image data Dv received from a CPU or suchlike in an external computer, a plurality of video signal lines (column electrodes), which cross each of the scanning signal lines, and a plurality of pixel forming portions, which are provided so as to correspond to respective intersections of the scanning signal lines and the video signal lines. The pixel forming portions are configured basically in the same manner as in conventional active-matrix liquid crystal panels (details will be described later).

In the present embodiment, (narrow) image data that represents an image to be displayed on the liquid crystal panel 500 and data for determining, for example, the timing of a display operation (e.g., data indicating a clock frequency for display; referred to below as "display control data") are sent to the display control circuit 200 from a CPU or suchlike of an external computer (the externally sent data Dv will be referred to below as "broad image data"). Specifically, the external CPU or suchlike supplies the display control circuit 200 with the (narrow) image data and the display control data, which are included in the broad image data Dv, along with an address signal ADw, so that the image data and the display control data are respectively written to display memory and a register, which will be described later, in the display control circuit 200.

On the basis of the display control data written in the register, the display control circuit 200 generates various signals, including a source clock signal SCK and a source start pulse signal SSP, which are provided to the video signal line drive circuit 300 for display, and also including two gate clock signals $GCK_1$ and $GCK_2$, a gate start pulse signal GSP, and an enable signal EN for selecting either even or odd scanning signal lines, which are provided to the scanning signal line driver circuit 400 for display. Among these signals, the source clock signal SCK and the source start pulse signal SSP are known, therefore, any detailed descriptions thereof will be omitted, and the signals to be provided to the scanning signal line drive circuit 400 will be described in detail later.

Furthermore, the display control circuit 200 reads the (narrow) image data written to the display memory by the external CPU or suchlike, from the display memory, and outputs the data as a digital image signal Da. In addition, the display control circuit 200 generates and outputs switching control signals $GS_a$ to $GS_c$ for driving the video signal lines in a time-division manner (these signals will also be referred to below as "switching control signals GS"). The switching control signals $GS_a$ to $GS_c$ are set at H level for an equal period of time, which will be described in detail later.

In this manner, among the signals generated by the display control circuit 200, the digital image signal Da is supplied to the video signal line drive circuit 300, and the switching control signals $GS_a$ to $GS_c$ are supplied to the video signal line drive circuit 300 and also to a connection switching circuit in the liquid crystal panel 500, which will be described later. Note that the number of signal lines provided to supply the digital image signal Da from the display control circuit 200 to the video signal line driver circuit 300 corresponds to the number of tones of images to be displayed.

In addition to the data that represents an image to be displayed on the liquid crystal panel 500, which is serially supplied in units of a pixel as the digital image signal Da, the video signal line drive circuit 300 is supplied with timing-indicating signals, including the source clock signal SCK, the source start pulse signal SSP, and the switching control signals GS, as described above. On the basis of the digital image signal Da, the source clock signal SCK, the source start pulse signal SSP, and the switching control signals GS, the video signal line drive circuit 300 generates video signals for driving the liquid crystal panel 500 (also referred to below as "drive video signals"), and outputs the signals to the video signal lines of the liquid crystal panel 500.

Specifically, the video signal line drive circuit 300 includes a shift register circuit for receiving the source clock signal SCK and the source start pulse signal SSP outputted by the display control circuit 200 and outputting a predetermined sampling pulse, a data latch circuit for receiving the digital image signal Da and the switching control signals GS outputted by the display control circuit 200, along with the sampling pulse, and latching data that indicates pixel values included in the digital image signal Da, a level shifter circuit for shifting the voltage of the data latched by the data latch circuit, a D/A conversion circuit for converting the digital data with its voltage shifted by the level shifter circuit into analog voltage signals, and an output buffer circuit for applying the analog voltage signals from the D/A conversion circuit to their corresponding video signal lines Ls. These components are similar to those used in conventional video signal line drive circuits.

On the basis of the gate clock signals (also referred to below as "gate clocks") $GCK_1$ and $GCK_2$, the gate start pulse signal GSP, and the enable signal EN, the scanning signal line drive circuit 400 generates scanning signals $G_1$, $G_3$, $G_5$, and so forth, which are applied to scanning signal lines of the liquid crystal panel 500 in order to select every other scanning signal line for one horizontal scanning period, i.e., in order to sequentially select odd scanning signal lines, and subsequently, the scanning signal line drive circuit 400 generates scanning signals $G_2$, $G_4$, $G_6$, and so forth, which are applied to even scanning signal lines in order to sequentially select the even scanning signal lines. In this manner, active scanning signals are repeatedly applied to the scanning signal lines in cycles of one vertical scanning period in order to sequentially select every other scanning signal line, thereby selecting all of the scanning signal lines. This scanning scheme is referred to as an interlacing drive scheme or an interlaced scanning scheme.

As described above, the video signal line drive circuit 300 applies drive video signals $S_1$, $S_2$, $S_3$, and so forth, which are based on the digital image signal Da, to the video signal lines of the liquid crystal panel 500, and the scanning signal line drive circuit 400 applies scanning signals $G_1$, $G_2$, $G_3$, and so forth to the scanning signal lines of the liquid crystal panel 500. As a result, the liquid crystal panel 500 displays the image that is represented by the image data Dv received from the external CPU or suchlike.

<1.2 Display Control Circuit>

Figure 2:
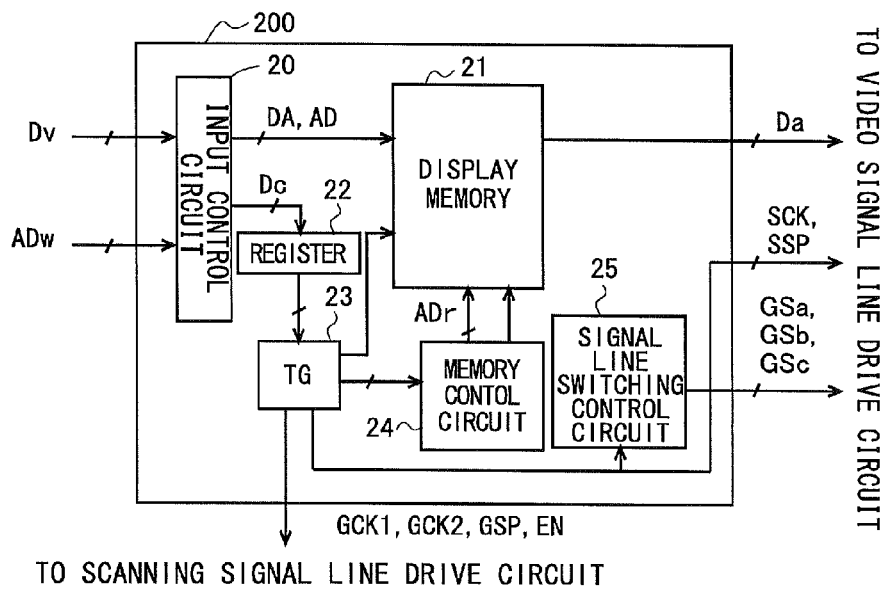
FIG. 2 is a block diagram illustrating the configuration of a display control circuit in the embodiment.

FIG. 2 is a block diagram illustrating the configuration of the display control circuit 200 of the liquid crystal display device. The display control circuit 200 includes an input control circuit 20, display memory 21, a register 22, a timing generation circuit 23, a memory control circuit 24, and a signal line switching control circuit 25.

The display control circuit 200 receives a signal which provides broad image data Dv (this signal will also be denoted below by the characters "Dv") and an address signal ADw from the external CPU or suchlike, and the received signals are inputted to the input control circuit 20. In accordance with the address signal ADw, the input control circuit 20 sorts the broad image data Dv into image data DA and display control data Dc. Thereafter, signals which represent the image data DA (these signals will also be denoted below by the characters "DA"), along with an address signal AD based on the address signal ADw, are supplied to the display memory 21, thereby writing the image data DA to the display memory 21, and also the display control data Dc is written to the register 22. The display control data Dc includes timing information that specifies frequencies of clock signals, including the source clock signal SCK, and also specifies horizontal and vertical scanning periods for displaying the image that is represented by the image data Dv.

The timing generation circuit (abbreviated below as "TG") 23 generates a source clock signal SCK and a source start pulse signal SSP on the basis of the display control data held in the register 22. Moreover, the TG 23 generates timing signals for causing the display memory 21 and the memory control circuit 24 to operate in synchronization with the source clock signal SCK.

The memory control circuit 24 generates an address signal ADr to read data that represents the image to be displayed on the liquid crystal panel 500, from among the image data DA externally inputted and stored to the display memory 21 via the input control circuit 20, and the memory control circuit 24 also generates a signal to control the operation of the display memory 21. The address signal ADr and the control signal are provided to the display memory 21, so that the data that represents the image to be displayed on the liquid crystal panel 500 is read from the display memory 21 and outputted from the display control circuit 200 as a digital image signal Da. The digital image signal Da is supplied to the video signal line drive circuit 300, as has already been described.

Figure 6:
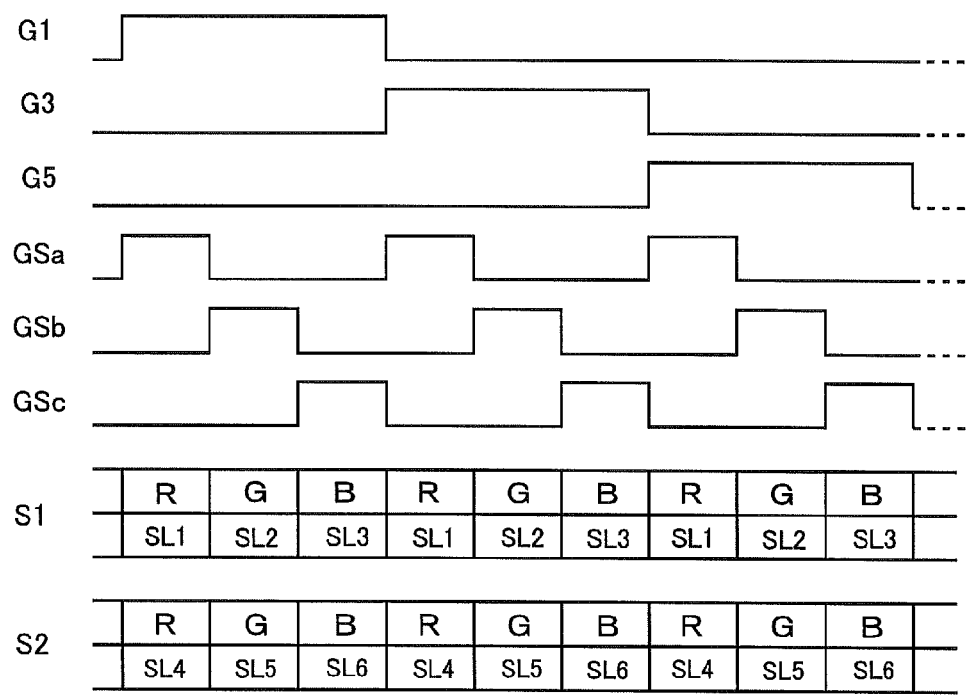
FIG. 6 is a timing chart describing a drive method in the embodiment.

On the basis of the timing signals from the TG 23, the signal line switching control circuit 25 generates switching control signals $GS_a$ to $GS_c$ to drive the video signal lines in a time-division manner. The switching control signals $GS_a$ to $GS_c$ are control signals to change video signal lines to which a video signal outputted by the video signal line drive circuit 300 is applied, within one horizontal scanning period, thereby driving the video signal lines in a time-division manner, as will be described later. In the present embodiment, as shown in FIG. 6, a signal that is to be set at H level during the first of three sections of each horizontal scanning period (a period in which scanning signals are active) and at L level during the other sections is generated as a switching control signal $GS_a$, a signal that is to be set at H level during the second section and at L level during the other sections is generated as a switching control signal $GS_b$, and further, a switching control signal $GS_c$ is generated similarly.

<1.3 Liquid Crystal Panel and Drive Method Therefor>
<1.3.1 Configuration of the Liquid Crystal Panel>

Figure 3:
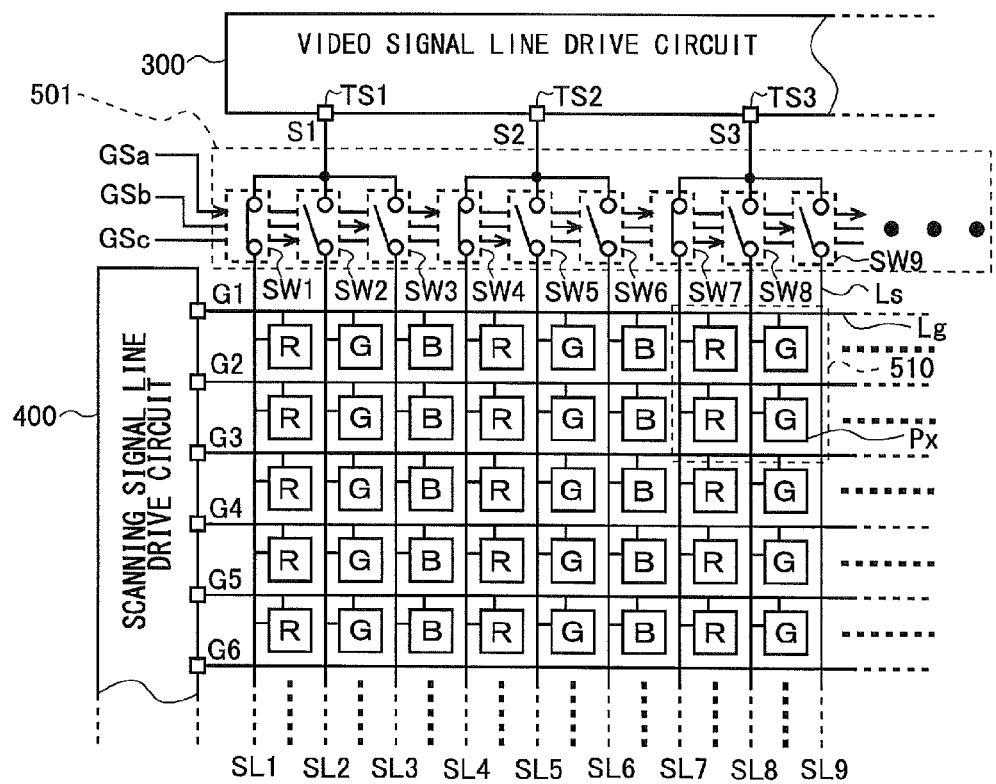
FIG. 3 is a schematic diagram describing the basic configuration of a liquid crystal panel in the embodiment.
Figure 4:
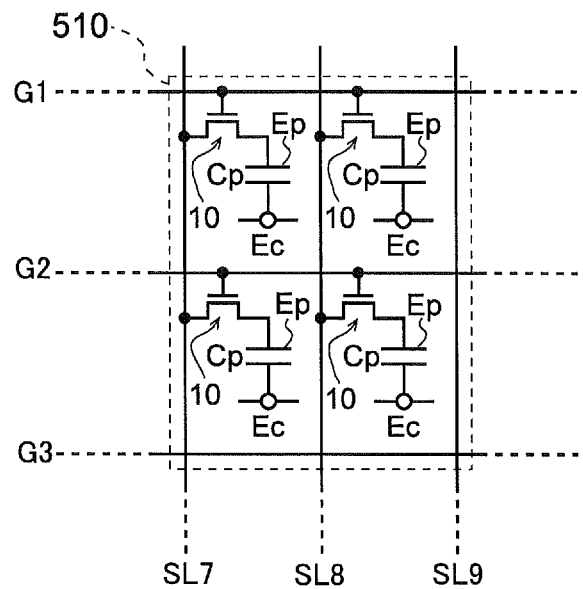
FIG. 4 is an equivalent circuit diagram of a part of the liquid crystal panel in the embodiment.
Figure 5:
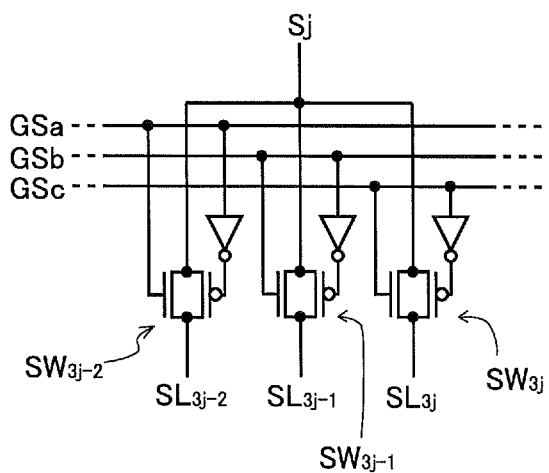
FIG. 5 is an equivalent circuit diagram illustrating changeover switches included in a connection switching circuit of the liquid crystal panel in the embodiment.

FIG. 3 is a schematic diagram illustrating the configuration of the liquid crystal panel 500 in the present embodiment, FIG. 4 is an equivalent circuit diagram of a part (a portion corresponding to four pixels) 510 of the liquid crystal panel, and FIG. 5 is an equivalent circuit diagram illustrating change-over switches included in the connection switching circuit 501 of the liquid crystal panel to be described later.

The liquid crystal panel configured similarly to conventional liquid crystal panels includes a plurality of video signal lines Ls connected to the video signal line drive circuit 300 via the connection switching circuit 501 including analog switches $SW_1$, $SW_2$, $SW_3$, and so forth, and a plurality of scanning signal lines Lg connected to the scanning signal line drive circuit 400, and the video signal lines Ls and the scanning signal lines Lg are arranged in a grid so as to cross each other. A plurality of pixel forming portions Px are provided so as to correspond to respective intersections of the video signal lines Ls and the scanning signal lines Lg, as has already been described. As shown in FIG. 4, each pixel forming portion Px consists of a TFT 10, which has a source terminal connected to the video signal line Ls that passes through its corresponding intersection, a pixel electrode Ep connected to a drain terminal of the TFT 10, an opposing electrode Ec commonly provided to the pixel forming portions Px, and a liquid crystal layer commonly provided to the pixel forming portions Px between the opposing electrode Ec and the pixel electrode Ep. The pixel electrode Ep, the opposing electrode Ec, and the liquid crystal layer provided therebetween create pixel capacitance Cp.

Pixel forming portions Px as above are arranged in a matrix to constitute a pixel-formation matrix. Incidentally, the pixel electrodes Ep, which are essential parts of the pixel forming portions Px, are in one-to-one correspondence with pixels in an image displayed on the liquid crystal panel, and therefore can be considered the same as the pixels. Accordingly, for convenience of explanation, the pixel forming portions Px will be considered below the same as pixels, and the "pixel-formation matrix" will also be referred to as a "pixel matrix".

In FIG. 2, "R", "G", or "B" is assigned to each pixel forming portion Px to represent the color red, green, or blue of the pixel formed by that pixel forming portion Px. Note that these colors are three typical primary colors, but they may be another combination of three primary colors. Moreover, in a general liquid crystal display device, polarity inversion drive is performed to suppress liquid crystal deterioration and maintain display quality, and the present embodiment employs a typical polarity inversion drive scheme called a line inversion drive scheme in which the polarity of a voltage applied to the liquid crystal layer included in the pixels is inverted every scanning signal line and also every frame.

As described above, the liquid crystal panel has the connection switching circuit 501 formed thereon, which includes the analog switches $SW_1$, $SW_2$, $SW_3$, and so forth corresponding to their respective video signal lines Ls on the liquid crystal panel, as elements to connect the video signal lines Ls to the video signal line drive circuit 300 (see FIG. 2), and the analog switches $SW_1$, $SW_2$, $SW_3$, and so forth are divided into groups of three adjacent analog switches (the number of groups being ⅓ of the number of video signal lines Ls). Each analog switch $SW_i$ (where i=1, 2, 3, . . . ) in each group is connected at one end to its corresponding video signal line Ls and connected at the other end to the other switches in the same group and also to one output terminal $TS_j$ (where j=1, 2, 3, . . . ) of the video signal line drive circuit 300.

In this manner, the video signal lines Ls of the liquid crystal panel are divided into groups of three, and each video signal line group (three video signal lines Ls in the same group) is connected to one output terminal $TS_j$ of the video signal line drive circuit 300 via three analog switches in the same group. In this manner, the output terminals $TS_j$ of the video signal line drive circuit 300 are in one-to-one correspondence with the video signal line groups, so that each terminal is connected to the same group of video signal lines (three video signal lines Ls) via three analog switches in the same group.

Here, each analog switch $SW_i$ is realized by two thin-film transistors (TFTs) and an inverter formed on the liquid crystal panel board, and three analog switches $SW_{(3j-2)}$, $SW_{(3j-1)}$, and $SW_{3j}$ (where j=1, 2, 3) in the same group are configured to be turned on/off in accordance with switching control signals $GS_a$ to $GS_c$, as shown in FIG. 5. Accordingly, in each group, three analog switches $SW_{(3j-2)}$, $SW_{(3j-1)}$, and $SW_{3j}$ as shown in FIG. 5 constitute a change-over switch, which connects one output terminal $TS_j$ of the video signal line drive circuit 300 to a group of three video signal lines corresponding to that output terminal $TS_j$ in a time-division manner. The structure of the analog switches will be further described.

Each analog switch $SW_i$ consists of an n-channel TFT, a p-channel TFT, and an inverter (NOT-logic circuit), as shown in FIG. 5, the n-channel TFT receives a corresponding one of the switching control signals $GS_a$ to $GS_c$ at its gate terminal, and the p-channel TFT receives a logic inversion signal of the corresponding one of the switching control signals $GS_a$ to $GS_c$ at its gate terminal via the inverter. Accordingly, when the received one of the switching control signals GSa to GSc is at H level, the TFTs are rendered conductive between their drains and sources. A drive method for the liquid crystal display device, including the switching operation by the analog switches, will be described below with reference to FIG. 5.

<1.3.2 Drive Method>

FIG. 6 is a timing chart describing a drive method for the liquid crystal display device. Scanning signals $G_1$, $G_3$, $G_5$, and so forth, which are sequentially set at H level within one horizontal scanning period (one scanning line selection period), as shown in FIG. 6, are applied to odd scanning signal lines Lg on the liquid crystal panel. When the applied scanning signals $G_1$, $G_3$, $G_5$, and so forth are at H level, the scanning signal lines Lg are selected (activated), the TFTs 10 of the pixel forming portions Px connected to the selected scanning signal lines Lg are turned on, and on the other hand, when the applied scanning signals $G_1$, $G_3$, $G_5$, and so forth are at L level, the scanning signal lines Lg are deselected (deactivated), the TFTs 10 of the pixel forming portions Px connected to the deactivated scanning signal lines Lg are turned off.

As shown in FIG. 6, the switching control signal $GS_a$ is set at H level during the first of three sections of each horizontal scanning period (in which each scanning signal $G_k$ (k=1, 3, 5, . . . ) is set at H level), and it is set at L level during the rest of the period, i.e., the second and third sections.

Here, among the analog switches of the connection switching circuit 501, the analog switch $SW_{(3j-2)}$ connected to the (3j−2)'th video signal line Ls (also referred to below as the video signal line $SL_{(3j-2)}$) is turned on when the switching control signal $GS_a$ is at H level, and it is turned off when the switching control signal $GS_a$ is at L level. Moreover, the analog switch $SW_{(3j-1)}$ connected to the (3j−1)'th video signal line Ls is turned on when the switching control signal $GS_b$ is at H level, and it is turned off when the switching control signal $GS_b$ is at L level. Similarly, the analog switch $SW_{3j}$ connected to the 3j'th video signal line Ls is turned on when the switching control signal $GS_c$ is at H level, and it is turned off when the switching control signal $GS_c$ is at L level.

Accordingly, the output terminal $TS_j$ of the video signal line drive circuit 300 is connected to the (3j−2)'th video signal line Ls during the first section of each horizontal scanning period, to the (3j−1)'th video signal line Ls during the second section of the horizontal scanning period, and similarly to the 3j'th video signal line Ls during the third section of the horizontal scanning period.

Therefore, for example, the video signals $S_1$ and $S_2$ to be outputted from the output terminals $TS_1$ and $TS_2$, respectively, of the video signal line drive circuit 300, are signals as shown in FIG. 6. Here, in the timing chart of FIG. 6, each of the video signals $S_1$ and $S_2$ is represented by two rows, i.e., upper and lower rows; the upper row indicates (the pixel value of) the color to be displayed in the pixel forming portion Px in accordance with the video signal $S_1$ or $S_2$, and the lower row indicates the video signal line to which the video signal $S_1$ or $S_2$ is applied.

To output such video signals, the video signal line drive circuit 300 initially receives a sequence of pixel values (here, pixel values for display in R) from the display control circuit 200, the pixel values being written to some of the pixel forming portions Px in the (3j−2)'th pixel column of the pixel matrix that have their TFTs 10 turned on by a scanning signal $G_k$, and video signals $S_j$ corresponding to the pixel values are outputted from the output terminal $TS_j$ during the first section of a horizontal scanning period.

Received next are a sequence of pixel values (here, pixel values for display in G) from the display control circuit 200, which are written to some of the pixel forming portions Px in the (3j−1)'th pixel column of the pixel matrix that have their TFTs 10 turned on by a scanning signal $G_k$, and video signals $S_j$ corresponding to the pixel values are outputted from the output terminal $TS_j$ during the second section of the horizontal scanning period.

Similarly, further received are a sequence of pixel values (here, pixel values for display in B) from the display control circuit 200, which are written to some of the pixel forming portions Px in the 3j'th pixel column of the pixel matrix that have their TFTs 10 turned on by a scanning signal Gk, and video signals $S_j$ corresponding to the pixel values are outputted from the output terminal $TS_j$ during the third section of the horizontal scanning period.

In this manner, the video signal line drive circuit 300 repeats every horizontal period the operation of writing pixel values that correspond to respective colors to pixel forming portions Px via video signal lines Ls in the order R, B, G, R, B, G, . . . . Thereafter, when all odd scanning signal lines are selected, similar operations are sequentially performed on even scanning signal lines, so that pixel values are written to all pixel forming portions Px.

Here, the polarity inversion cycle of the drive video signals $S_1$, $S_2$, $S_3$, and so forth is preferably long. The reason for this is that polarity inversions result in significant potential changes, which increases power consumption. However, when the polarity inversion cycle is long, the difference between the positive and negative polarities of voltages applied to the liquid crystal causes display flickering (flicker), and when pixels to which voltages of the same polarity are applied within the same screen are spatially dispersed, the voltages are averaged, resulting in enhanced display quality. Accordingly, it is normally preferable to perform a row-by-row polarity inversion operation. Therefore, in the case of the video signal line drive circuit 300 of the present embodiment also, when all odd scanning signal lines are selected, the polarity of the drive video signals $S_1$, $S_2$, $S_3$, and so forth is inverted, so that the odd scanning signal lines are sequentially selected. Thereafter, upon completion of display for one frame period, the polarity of the drive video signals $S_1$, $S_2$, $S_3$, and so forth is set such that the applied voltages are inverted frame-by-frame, and subsequently, similar polarity inversions will be repeated.

Figure 7:
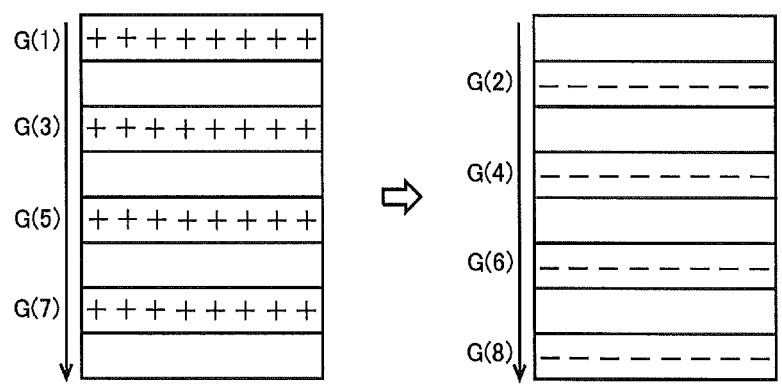
FIG. 7 is a diagram describing a row-by-row polarity inversion operation in the embodiment.
Figure 7:
Figure 7:
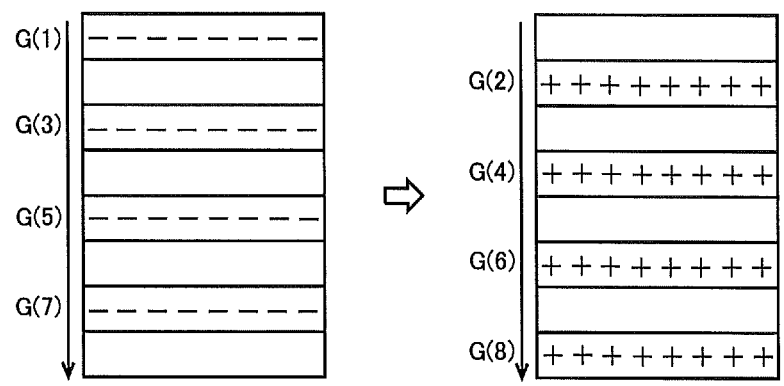

FIG. 7 is a diagram describing the aforementioned row-by-row polarity inversion operation. As shown in FIG. 7, the polarity of the drive video signals $S_1$, $S_2$, $S_3$, and so forth is negative when odd scanning lines are selected, and their polarity is positive when even scanning lines are selected; the polarity is opposite in the next frame. Here, the positive polarity indicates that a positive voltage is applied to the pixel liquid crystal included in the pixel forming portions Px (i.e., the voltage applied to the pixel electrodes Ep being positive relative to the opposing electrode Ec), and the negative polarity indicates that a negative voltage is applied. Such a drive scheme in which the polarity of a voltage applied to the pixel liquid crystal is inverted row-by-row is referred to as a line inversion drive scheme.

Furthermore, it is also possible to employ a dot inversion drive scheme, which is a drive scheme in which the polarity of a voltage applied to the pixel liquid crystal is inverted every two vertically/horizontally adjacent pixel matrices and is also inverted every frame. However, in order to allow polarity inversions in horizontally adjacent pixel matrices, it is necessary to invert the polarity at each output terminal $TS_j$ of the video signal line drive circuit 300 during each of the time periods from the first to the second section of a horizontal period, from the second to the third section, and from the third to the first section of the next period, which results in increased power consumption, and it is also necessary for the video signal line drive circuit 300 to have higher drive capability. Moreover, it is also possible to employ a 3-dot inversion drive scheme in which the polarity of a voltage applied to the pixel liquid crystal is inverted every row, every three horizontally adjacent pixel matrices, and also every frame.

Figure 8:
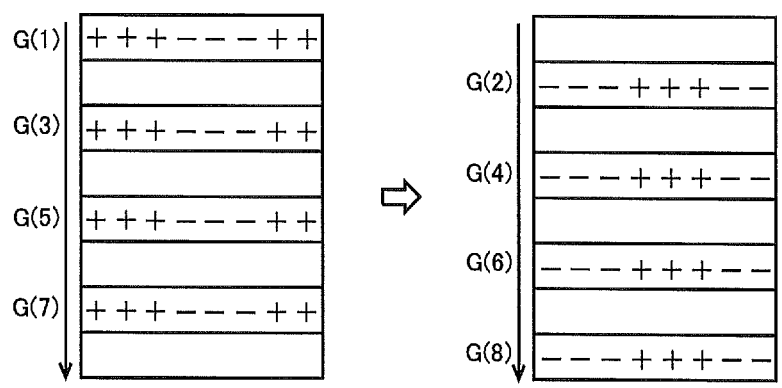
FIG. 8 is a diagram describing a 3-dot inversion drive operation in the embodiment.
Figure 8:
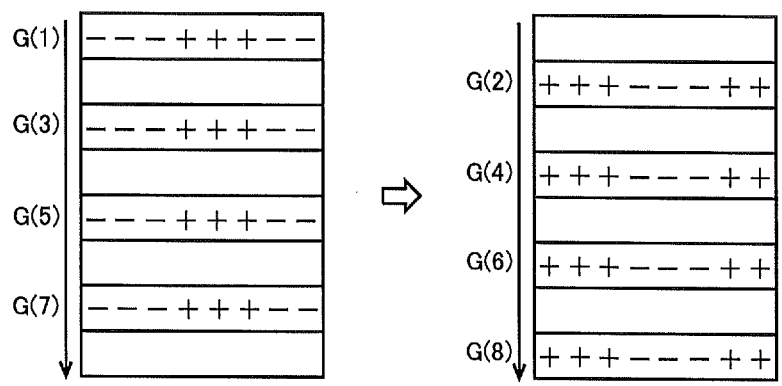

FIG. 8 is a diagram describing the aforementioned 3-dot inversion drive operation. As shown in FIG. 8, when odd scanning lines are selected, the polarity of the drive video signals $S_1$, $S_2$, and $S_3$ is positive, the polarity of the drive video signals $S_4$, $S_5$, and $S_6$ is negative, and further polarity inversions similarly occur every three pixels in the horizontal direction. Moreover, when even scanning lines are selected, the polarity of the drive video signals $S_1$, $S_2$, and $S_3$ is negative, the polarity of the drive video signals $S_4$, $S_5$, and $S_6$ is positive, and further polarity inversions similarly occur every three pixels in the horizontal direction. Each of the polarities are opposite in the next frame. Through the above operation, dot inversion drive with higher display quality can be realized.

Note that in the case of a general liquid crystal display device in which the output terminals $TS_j$ of the video signal line drive circuit 300 are connected to video signal lines, the drive mode as described above renders it possible to realize 1-dot inversion drive, rather than the scheme of the present embodiment in which video signal lines are driven in a time-division manner (referred to below as a time-division drive scheme). Moreover, in the case of the configuration of the present embodiment also, by adjusting the order of activating/deactivating analog switches in the connection switching circuit 501, it becomes possible to realize 1-dot inversion drive while keeping the polarity inversion cycle long. Such a configuration will be described later. Next, characteristic features of the scanning signal line drive circuit 400 to realize the aforementioned interlacing drive will be described.

<1.3.3 Configuration of the Scanning Signal Line Drive Circuit>

Figure 9:
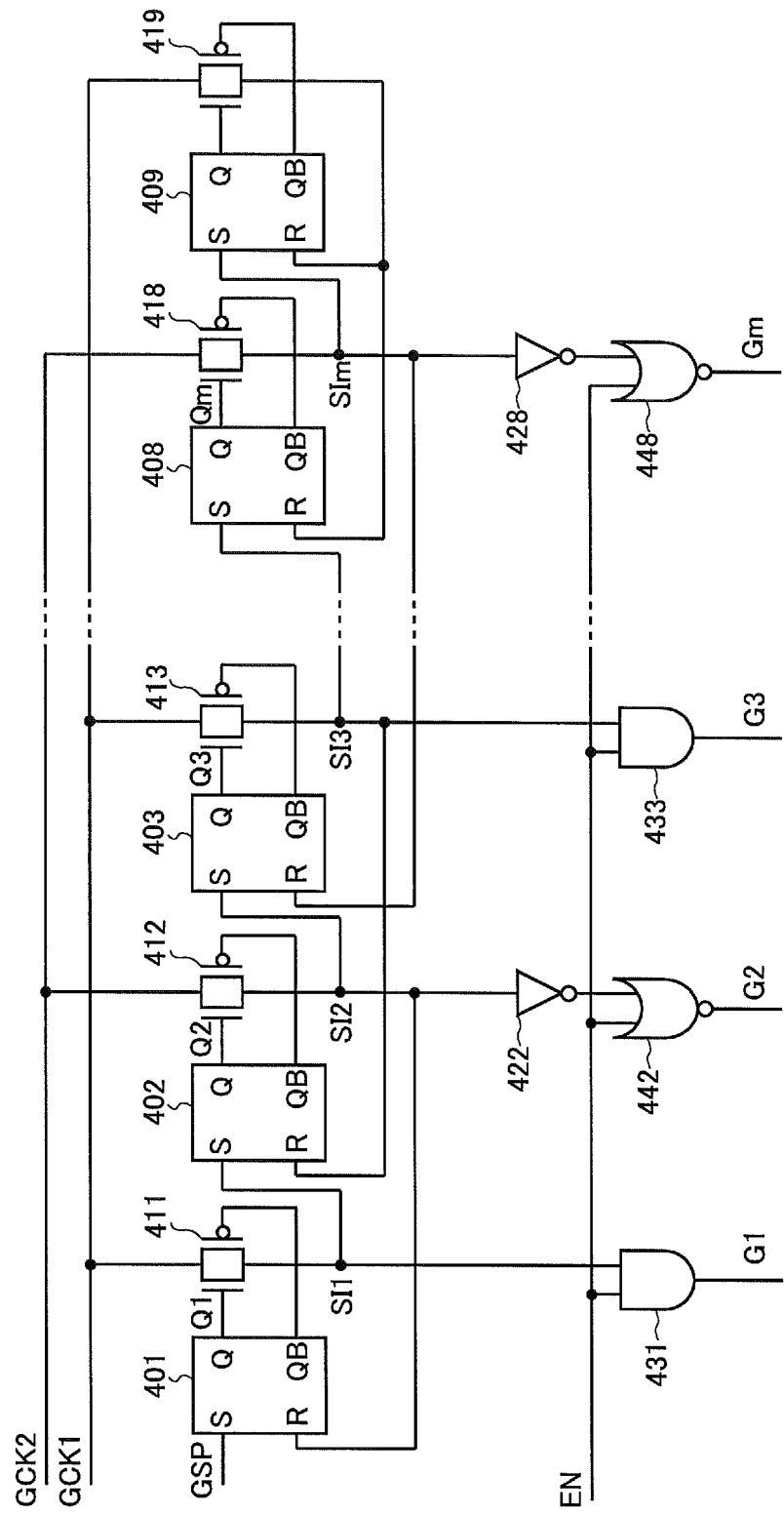
FIG. 9 is a block diagram illustrating in detail the configuration of a scanning signal line drive circuit in the embodiment.

FIG. 9 is a block diagram illustrating in detail the configuration of the scanning signal line drive circuit 400. In the case where there are m scanning signal lines, the scanning signal line drive circuit 400 shown in FIG. 9 includes (m+1) RS-FF circuits 401 to 409, (m+1) switch circuits 411 to 419, m/2 NOT circuits 422 to 428, m/2 AND circuits 431 to 433, and m/2 NOR circuits 442 to 448.

The RS-FF circuit 402 receives a gate start pulse GSP from the display control circuit 200 at its set terminal S, and outputs a signal $Q_1$ and a logic inversion signal thereof from its output terminals Q and QB. The switch circuit 411 is rendered conductive when the signal $Q_1$ is at an on-potential, so that a gate clock $GCK_1$ passes therethrough to be provided to both an input terminal of the AND circuit 431 and a set terminal S of the RS-FF circuit 402 in the next stage as a signal $SI_1$. The RS-FF circuit 402 outputs a signal $Q_2$ and a logic inversion signal thereof from its output terminals Q and QB, and the switch circuit 412 is rendered conductive when the signal $Q_2$ is at an on-potential, so that a gate clock $GCK_2$ passes therethrough to be provided to both an input terminal of the NOT circuit 422 and a set terminal S of the RS-FF circuit 403 in the next stage as a signal $SI_2$. In this manner, the RS-FF circuits output signals $Q_1$ to $Q_m$ sequentially to the RS-FF circuits in their subsequent stages, so that signals $SI_1$ to $SI_m$ are sequentially outputted from the switch circuits. Note that the RS-FF circuits have their respective reset terminals R to be provided with the signals $SI_1$ to $SI_m$ outputted by the signals Q from the RS-FF circuits in their subsequent stages being set at an on-potential. In this manner, the RS-FF circuits and the switch circuits function as a shift register circuit for sequentially outputting the signals $S_1$ to $SI_m$.

Furthermore, each of the AND circuits is connected at one input terminal to an EN signal line, and in the case where an enable signal EN is at an on-potential, when a corresponding one of the signals $SI_1$ to $SI_m$ (abbreviated below as signals SI) at the other input terminal is set to an on-potential, scanning signals $G_1$, $G_3$, ..., $G_{(m-1)}$ are outputted to odd scanning signal lines $GL_1$, $GL_3$, ..., $GL_{(m-1)}$. Each of the NOR circuits is also connected at one input terminal to the EN signal line, and in the case where the enable signal EN is at an off-potential, when the signal SI at the other input terminal is set to an on-potential, scanning signals $G_2$, $G_4$, ..., $GL_{(m-1)}$ are outputted to even scanning signal line $GL_2$, $GL_4$, ..., $GL_m$. In this manner, the AND circuits and the NOR circuits (as well as the NOT circuits) function as a selection circuit for selectively outputting the signals SI in accordance with the enable signal EN. Note that in actuality, output signals from logic circuits, such as the AND circuits, are not applied directly to their corresponding scanning signal lines, but a well-known level shifter circuit sets the signals to appropriate voltage values suited to the characteristics of the liquid crystal panel. However, for simplification of explanation, such features are omitted herein.

Figure 10:
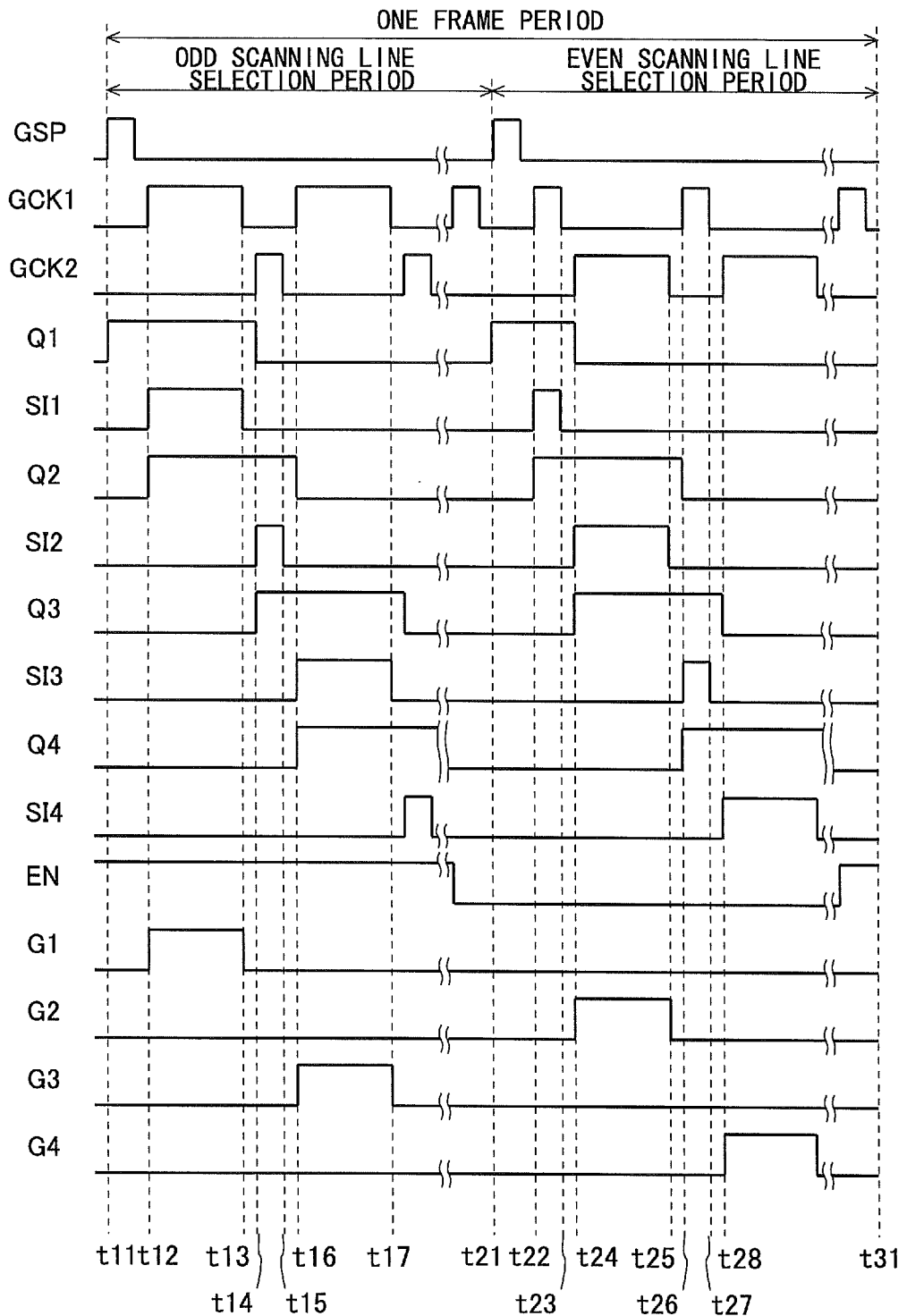
FIG. 10 is a waveform diagram of each signal for the scanning signal line drive circuit in the embodiment.

The waveform of each of the above signals is shown in FIG. 10. FIG. 10 is a waveform diagram of each signal for the scanning signal line drive circuit 400. As shown in FIG. 10, one frame period is divided into two periods: odd and even scanning line selection periods, and the gate start pulse GSP is provided at the beginning of each of the selection periods. Initially, during the odd scanning line selection period, the gate start pulse GSP is set at on-level from time t11 to time t12, then, the potential of the gate clock $GCK_1$ is set at on-level from time t12 to time t13, and the potential of the gate clock $GCK_2$ is set at on-level from time t14 to time t15, so that the on-potential period thereof does not overlap with the on-potential period of the other gate clock (i.e., the potentials are not set at on-level at the same time). Thereafter, similar waveforms are repeated such that the potential of the gate clock $GCK_1$ is set at on-level from time t16 to time t17, and similarly, the potential of the gate clock $GCK_2$ is set at on-level, so that the on-potential period thereof does not overlap with the on-potential period of the other gate clock.

During the even scanning line selection period, the gate start pulse GSP is set at on-level from time t21 to time t22, the gate clock $GCK_1$ is set at on-level from time t22 to time t23 such that this on-potential period does not overlap with the on-potential period of the gate clock $GCK_2$, and then, the potential of the gate clock $GCK_2$ is set at on-level from time t24 to time t25; similar waveforms are repeated thereafter.

As shown in FIG. 10, the on-periods (active periods) of the odd scanning signals $G_1$, $G_3$, and $G_{(m-1)}$ are equivalent to the on-periods of the gate clock $GCK_1$, the on-periods (active periods) of the even scanning signals $G_2$, $G_4$, and $G_m$ are equivalent to the on-periods of the gate clock $GCK_2$, and an invalid period, which is equivalent to an off-period between scanning signals on adjacent signal lines, is defined by an off-period between on-periods, which are equivalent to on-periods (active periods) of the scanning signals including the gate clock $GCK_1$ or $GCK_2$.

Furthermore, during the odd scanning line selection period, the enable signal EN is turned on by the AND circuits and other circuits, which function as a selection circuit, so that only the signals $SI_1$, $SI_3$, and $SI_{(m-1)}$, which correspond to the odd scanning signals $G_1$, $G_3$, and $G_{(m-1)}$ and should be provided to odd scanning signal lines, are selected, and the signals $SI_2$, $SI_4$, $SI_m$, which are not yet to be provided to even scanning signal lines, are not selected. Moreover, during the even scanning line selection period, the enable signal EN is turned off, so that only the signals $SI_2$, $SI_4$, and $SI_m$, which correspond to the even scanning signals $G_2$, $G_4$, and $G_m$ and should be provided to even scanning signal lines, are selected.

<1.4 Effects>

As described above, by simply changing the potential of the enable signal EN (i.e., by simply providing the EN signal line), outputs from the RS-FF circuits and the switch circuits, which function as a shift register circuit, can be provided as scanning signals to be selectively outputted during the odd and even scanning line selection periods, resulting in a reduced wiring area for control lines. Moreover, simple control allows circuit simplification, resulting in a reduced circuit area. Accordingly, the frame area can be reduced, leading to a compact display panel. In addition, the aforementioned interlacing drive allows a reduction in the number of polarity inversions, thereby making it possible to reduce not only power consumption but also noise caused by potential changes on video signal lines. In particular, malfunction due to such noise can be prevented in touch panels mounted on display panel surfaces of recent mobile terminals.

<2. Second Embodiment>
<2.1 Overall Configuration and Operation>

Because the configuration of a liquid crystal display device according to a second embodiment of the present invention is similar to the configuration shown in FIG. 1 and the configuration and other details of the liquid crystal panel 500 are similar to those shown in, for example, FIG. 3, the same components are denoted by the same reference characters and any detailed descriptions thereof will be omitted. However, the present embodiment is different in terms of the logic circuit configuration that functions as a selection circuit included in the scanning signal line drive circuit 400. Detailed descriptions will be given below with reference to FIG. 11.

<2.2 Configuration and Operation of the Scanning Signal Line Drive Circuit>

Figure 11:
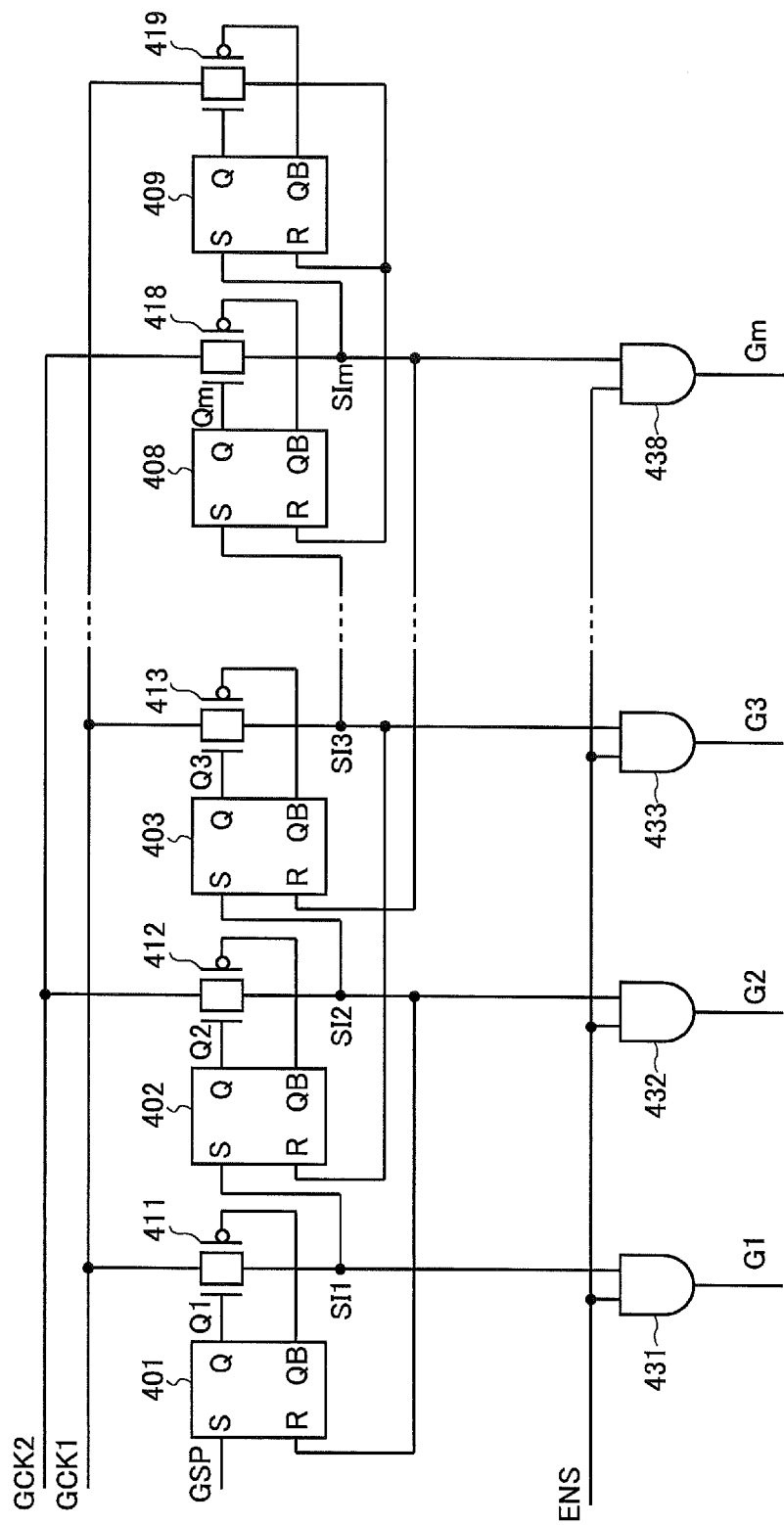
FIG. 11 is a block diagram illustrating in detail the configuration of a scanning signal line drive circuit in a second embodiment of the present invention.

FIG. 11 is a block diagram illustrating in detail the configuration of the scanning signal line drive circuit in the present embodiment. As with the scanning signal line drive circuit 400 in the first embodiment shown in FIG. 9, the scanning signal line drive circuit shown in FIG. 11 includes (m+1) RS-FF circuits 401 to 409 and (m+1) switch circuits 411 to 419, and also includes m AND circuits 431 to 439, in place of the m/2 NOT circuits 422 to 428, the m/2 AND circuits 431 to 433, and the m/2 NOR circuits 442 to 448 shown in FIG. 9. Accordingly, the present embodiment differs from the first embodiment in terms of the circuit configuration of a part that functions as a selection circuit.

Specifically, as with the AND circuit 431 and the other AND circuits in the first embodiment, each of the AND circuits 431 to 439 is connected at one input terminal to an ENS signal line, which corresponds to the EN signal line, and in the case where an enable signal ENS is at an on-potential, when the signal SI at the other input terminal is set to an on-potential, the scanning signals $G_1$, $G_2$, ..., $G_m$ are outputted to the odd scanning signal lines $GL_1$, $GL_2$, ..., $GL_m$.

Figure 12:
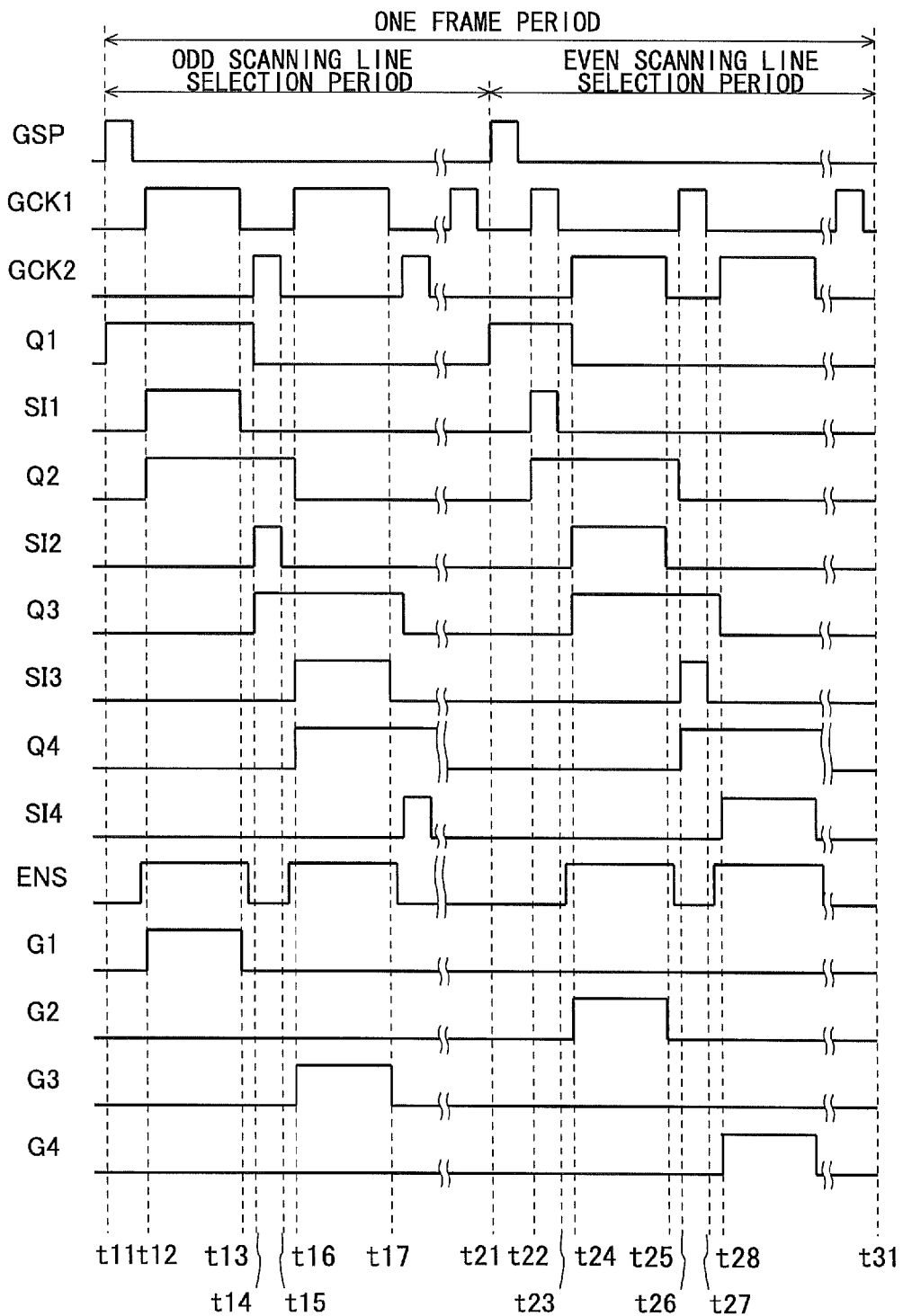
FIG. 12 is a waveform diagram of each signal for the scanning signal line drive circuit in the embodiment.

The waveform of each of the above signals is shown in FIG. 12. FIG. 12 is a waveform diagram of each signal for the scanning signal line drive circuit. Note that the waveforms of the signals shown in FIG. 12 are the same as those shown in FIG. 10, except for the enable signal ENS.

As shown in FIG. 12, the odd scanning signals $G_1$, $G_3$, and $G_{(m-1)}$ are equal to the even scanning signals $G_2$, $G_4$, and $G_m$ in terms of their on-periods (active periods) and invalid periods when their patterns relative to the gate start pulse GSP are compared. Therefore, the enable signal ENS is turned on/off in accordance with the on-periods (active periods) and the inactive periods, so that only the signals $SI_1$, $SI_3$, and $SI_{(m-1)}$, which correspond to the odd scanning signals $G_1$, $G_3$, and $G_{(m-1)}$ and should be provided to odd scanning signal lines, are selected because they are in their on-periods, and the signals $SI_2$, $SI_4$, $SI_m$, which are not yet to be provided to even scanning signal lines, are not selected because they are in their off-periods. Moreover, during the even scanning line selection period, only the signals $SI_2$, $SI_4$, and $SI_m$, which correspond to the even scanning signals $G_2$, $G_4$, and $G_m$ and should be provided to even scanning signal lines, are selected because they are in their on-periods, and the signals $SI_1$, $SI_3$, and $SI_{(m-1)}$, which are in their off-periods, are not selected.

<2.3 Effects>

As described above, the present embodiment, as with the first embodiment, renders it possible to reduce the wiring area for control lines, and also allows simple control, so that circuit simplification can be achieved, resulting in a reduced circuit area. In particular, the number of logic circuits that function as a selection circuit in the present embodiment is significantly smaller than in the first embodiment, so that the circuit area can be further reduced. Thus, it is possible to reduce the frame area and achieve a compact display panel.

However, the enable signal ENS of the present embodiment is a signal having a higher frequency than the enable signal EN of the first embodiment, and therefore, a sufficient line width is required. In this regard, in the first embodiment, the control line for transmitting the enable signal EN requires merely a narrow width, and therefore, the overall circuit area of the panel can be reduced.

<3. Third Embodiment>
<3.1 Overall Configuration and Operation>

Because the configuration of a liquid crystal display device according to a third embodiment of the present invention is similar to the configuration shown in FIG. 1, and the configuration and other details of the liquid crystal panel 500 are similar to those shown in, for example, FIG. 3, the same components are denoted by the same reference characters and any detailed descriptions thereof will be omitted. In addition, the configuration of the scanning signal line drive circuit is similar to that in the first or second embodiment, and therefore, any description thereof will be omitted.

Figure 13:
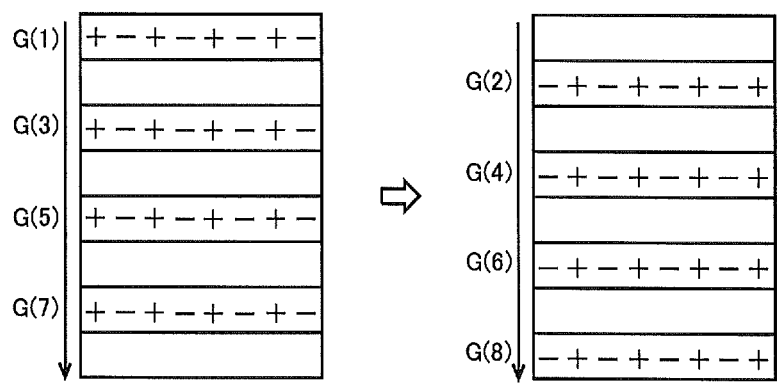
FIG. 13 is a diagram describing a 1-dot inversion drive operation in a third embodiment of the present invention.
Figure 13:
Figure 13:
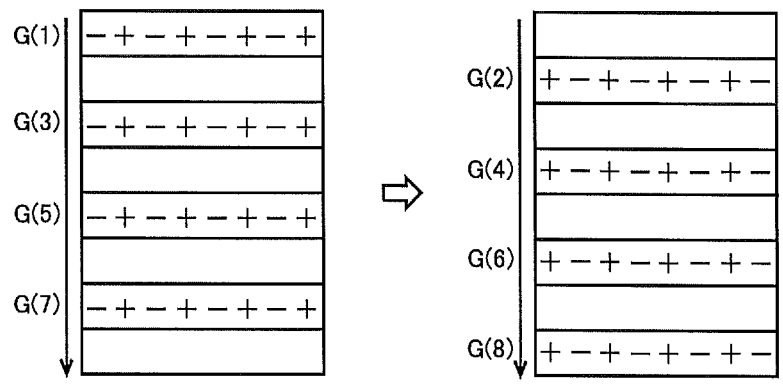

However, the present embodiment employs a 1-dot inversion drive scheme as shown in FIG. 13, rather than a line inversion drive scheme or a 3-dot inversion drive scheme as employed in the first (or second) embodiment or a variant thereof.

FIG. 13 is a diagram describing such a 1-dot inversion drive operation. As shown in FIG. 13, when odd scanning lines are selected, the polarity of the odd drive video signals $S_1$, $S_3$, $S_5$, and so forth is positive, the polarity of the even video signals $S_2$, $S_4$, $S_6$, and so forth is negative, and further polarity inversions similarly occur every pixel in the horizontal direction. Moreover, when even scanning lines are selected, the polarity of the odd drive video signals $S_1$, $S_3$, $S_5$, and so forth is negative, the polarity of the even video signals $S_2$, $S_4$, $S_6$, and so forth is positive, and further polarity inversions similarly occur every pixel in the horizontal direction. Each of the polarities is opposite in the next frame. Through the above operation, dot inversion drive with higher display quality can be realized.

Inverting the polarity of a video signal every video signal line is a simple method for performing the above drive, but in such a case, the polarity inversion cycle of the video signal is significantly short, so that the number of charges/discharges per unit time increases, resulting in increased power consumption. In addition, there is a possibility that high-frequency noise might occur. Therefore, the polarity inversion cycle of the video signal is lengthened by driving as shown in FIG. 14.

<3.2 Operation of the Video Signal Line Drive Circuit>

Figure 14:
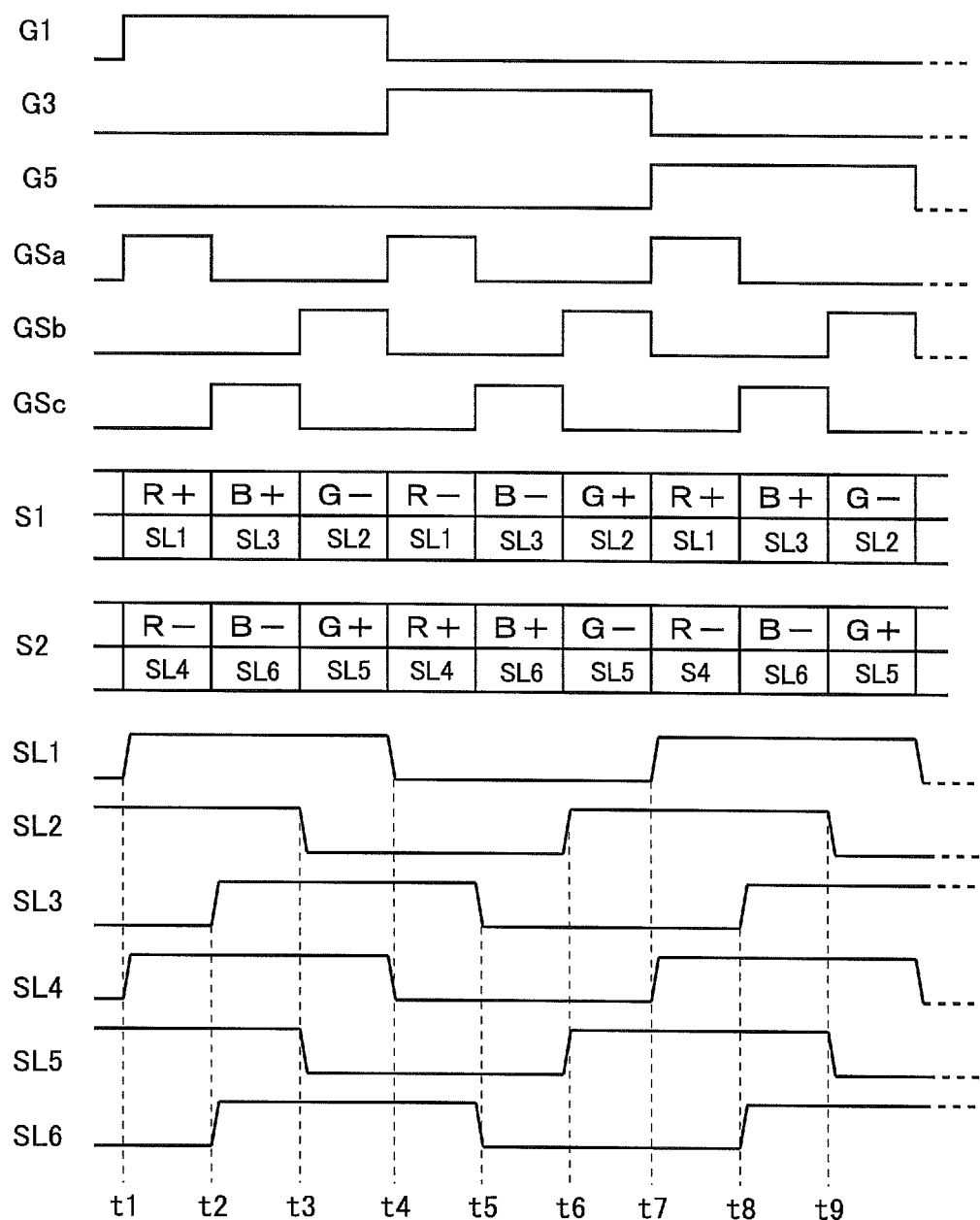
FIG. 14 is a timing chart describing a drive method in the embodiment.

FIG. 14 is a timing chart describing the method for driving the video signal lines of the present liquid crystal display device. Here, as can be appreciated by comparing FIG. 14 with FIG. 6, FIG. 14 is the same as FIG. 6 in that an analog switch $SW_{(3j-2)}$, which is an analog switch of the connection switching circuit 501 that is connected to the (3j−2)'th video signal line Ls, is turned on when the switching control signal $GS_a$ is at H level, and it is turned off when the switching control signal $GS_a$ is at L level, but there is a difference in that, as shown in FIG. 14, an analog switch $SW_{(3j-1)}$, which is connected to the (3j−1)'th video signal line Ls, is turned on when the switching control signal $GS_c$, rather than the switching control signal $GS_b$, is at H level, and it is turned off when the switching control signal $GS_c$ is at L level. In addition, an analog switch $SW_{3j}$, which is connected to the 3j'th video signal line Ls, is turned on when the switching control signal $GS_b$ is at H level, and it is turned off when the switching control signal $GS_b$ is at L level.

Accordingly, the output terminal $TS_j$ of the video signal line drive circuit 300 is connected to the (3j−2)'th video signal line Ls during the first section of each horizontal scanning period, to the 3j'th video signal line Ls during the second section of the horizontal scanning period, and also to the (3j−1)'th video signal line Ls during the third section of the horizontal scanning period.

Therefore, for example, the video signals $S_1$ and $S_2$ to be outputted from the output terminals $TS_1$ and $TS_2$, respectively, of the video signal line drive circuit 300, are signals as shown in FIG. 14. Note that the signs "+" and "−" in the figure denote positive and negative polarities, respectively.

In this manner, the video signal line drive circuit 300 repeats every horizontal period the operation of writing pixel values that correspond to respective colors to pixel forming portions Px via video signal lines Ls in the order R, G, B, R, G, B, . . . . Thereafter, when all odd scanning signal lines are selected, similar operations are sequentially performed on even scanning signal lines, so that pixel values are written to all pixel forming portions Px.

In this manner, the polarity inversion cycle of the drive video signals $S_1$, $S_2$, $S_3$, and so forth to be transmitted through the video signal lines $SL_1$, $SL_2$, $SL_3$, and so forth is lengthened to three times longer than that in the first embodiment, as shown in FIG. 14. Thus, power consumption of the device can be reduced.

<3.3 Effects>

As described above, the present embodiment, as with the first or second embodiment, renders it possible to reduce circuit area, resulting in a reduced frame area and a compact display panel. Moreover, the present embodiment renders it possible to perform 1-dot inversion drive while keeping the polarity inversion cycle long, so that it is possible to significantly reduce power consumption of the device while providing high-quality display by suppressing flicker due to the difference between voltages applied to the liquid crystal. In addition, noise caused by potential changes on video signal lines can be reduced, and in particular, malfunction due to such noise can be prevented in touch panels mounted on display panel surfaces of recent mobile terminals.

<4. Variant>

While the above embodiments have been described with respect to the examples where RS-FF circuits are used as circuit elements that function as a shift register, a circuit that realizes a similar operation may be configured by well-known bistable circuits, such as other types of flip-flop circuits and latch circuits (e.g., D-latch circuits). However, circuit scale reduction can be achieved by using the RS-FF circuits, which are configured in a simple manner.

While the above embodiments have been described with respect to the examples where signals are active when they are in on-state, the signals may be active when they are in off-state depending on the circuit configuration, and the potential of an active signal is not specifically limited.

While the above embodiments use liquid crystal elements that readily achieve the aforementioned effects because polarity inversion drive is essential, it is possible to use not only liquid crystal elements but also organic EL (Electroluminescent) elements, semiconductor LEDs (Light-Emitting Diodes), FED (Field Emission Display) elements, and so on, so long as they are used in active-matrix display devices with video signal lines.

Industrial Applicability

The present invention is applied to active-matrix display devices and is suitable for scanning signal line drive circuits of active-matrix liquid crystal display devices.

Description of the Reference Characters

10 TFT (thin-film transistor)
200 display control circuit
300 video signal line drive circuit
400 scanning signal line drive circuit
401 to 409 RS-FF circuit
411 to 419 switch circuit
422 to 428 NOT circuit
431 to 438 AND circuit
442, 448 NOR circuit
500 liquid crystal panel
Px pixel forming portion (pixel)
SCK source clock signal
SSP source start pulse signal
GSP gate start pulse signal
$G_1$ to $G_m$ scanning signal
$GCK_1$, $GCK_2$ gate clock signal

The invention claimed is:

1. A scanning signal line drive circuit for performing interlaced scanning to drive a plurality of scanning signal lines provided in an active-matrix display device such that odd scanning signal lines are sequentially driven by a corresponding scanning signals during a first period, and even scanning signal lines are sequentially driven by a corresponding scanning signals during a second period, the circuit comprising:

a shift register for providing output signals from output terminals coupled to their corresponding scanning signal lines, the output signals being activated sequentially; and a selection circuit for transmitting the output signals such that output signals from odd output terminals are provided only to their corresponding odd scanning signal lines during the first period, and output signals from even output terminals are provided only to their corresponding even scanning signal lines during the second period, wherein, the shift register provides first and second output signals during the first period and also provides third and fourth output signals during the second period, the first output signals being outputted from the odd output terminals and having active periods which are equivalent to active periods of scanning signals corresponding to the odd output terminals, the second output signals being outputted from the even output terminals and having active periods which correspond to invalid periods of the scanning signals and have a length less than or equal to the invalid period, the third output signals being outputted from the even output terminals and having active periods which are equivalent to active periods of scanning signals corresponding the output terminals, the fourth output signals being outputted from the odd output terminals and having active periods which correspond to invalid periods of the scanning signals and have a length less than or equal to the invalid period.

2. The scanning signal line drive circuit according to claim 1, wherein the shift register externally receives first and second clock signals and provides the first and second output signals sequentially in accordance with active periods in the first clock signal and also the third and fourth output signals sequentially in accordance with active periods in the second clock signal, the first clock signal including all of the active periods of the first output signals in the first period and also including all of the active periods of the fourth output signals in the second period, the second clock signal including all of the active periods of the second output signals in the first period and also including all of the active periods of the third output signals in the second period.

3. The scanning signal line drive circuit according to claim 2, wherein, the shift register includes:
  a plurality of switching elements each connecting a signal line for transmitting the first clock signal and a corresponding odd output terminal or connecting a signal line for transmitting the second clock signal and a corresponding even output terminal; and
  a plurality of bistable circuits for outputting control signals to control continuity of the switching elements, and the bistable circuits cause the switching elements to transition to a nonconductive state after causing the switching elements to sequentially transition from a nonconductive state to a conductive state such that the switching elements are not conductive simultaneously.

4. The scanning signal line drive circuit according to claim 2, wherein the bistable circuits are set-reset flip-flop circuits each having a set terminal connected to an output terminal of a switching element controlled by a bistable circuit in its previous stage and a reset terminal connected to an output terminal of a switching element controlled by a bistable circuit in its subsequent stage.

5. The scanning signal line drive circuit according to claim 1, wherein the selection circuit includes:
  a first logic circuit for receiving a control signal provided externally and an output signal outputted from the odd output terminal and outputting a signal which is active when both the output signal and the control signal are active, the control signal being active during the first period and also inactive during the second period; and
  a second logic circuit for receiving the control signal as well as an output signal outputted from the even output terminal and outputting a signal which is active when the output signal is active and the control signal is inactive.

6. The scanning signal line drive circuit according to claim 1, wherein the selection circuit includes logic circuits each receiving a control signal as well as an output signal outputted from the output terminal and outputting a signal which is active when both the output signal and the control signal are active, the control signal being active during a predetermined period including a period in which the scanning signal is active, the control signal being inactive during a period corresponding to the inactive period.

7. An active-matrix display device comprising:
  a scanning signal line drive circuit of claim 1; and
  a video signal line drive circuit for driving video signal lines arranged so as to cross the scanning signal lines, the video signal lines transmitting data signals to pixel portions which form pixels.

* * * * *